E. KUHN.
ELASTIC CONNECTING SHACKLE FOR VEHICLES.
APPLICATION FILED JUNE 27, 1921.

1,428,245.

Patented Sept. 5, 1922.

Patented Sept. 5, 1922.

1,428,245

UNITED STATES PATENT OFFICE.

ERNST KUHN, OF EFFRETIKON, SWITZERLAND.

ELASTIC CONNECTING SHACKLE FOR VEHICLES.

Application filed June 27, 1921. Serial No. 480,867.

*To all whom it may concern:*

Be it known that I, ERNST KUHN, a citizen of the Swiss Confederation, residing at Effretikon, Switzerland, have invented certain new and useful Improvements in Elastic Connecting Shackles for Vehicles, of which the following is a specification.

It has already been tried repeatedly to improve the usual plate springs for vehicles, e. g. by the insertion of spring eye bushes, pneumatic elements and the like between the frame and the main spring. A solution of the problem ensuring a really shock-free connection has not yet been found, although this is a very urgent demand at the actual state of the art.

This invention has for its object an elastic connecting shackle which can be used for vehicles of any kind, e. g. for motor cars, railway cars, motorcycles and bicycles. It is distinguished by being of simple construction, cheap to manufacture, easy to mount on new vehicles and on vehicles already in use and by guaranteeing an absolutely soft running of the vehicle.

All this is attained by the use of a curved plate spring composed of several superposed blades, having levers at its ends fulcrumed upon an axle arranged approximately at the center of the plate spring, means being provided upon the axle which are designed to absorb the chocks by friction.

In order that the invention may be clearly understood I shall hereafter described the same with reference to the form of construction shown by way of example in the accompanying drawing, wherein:—

Figure 1:
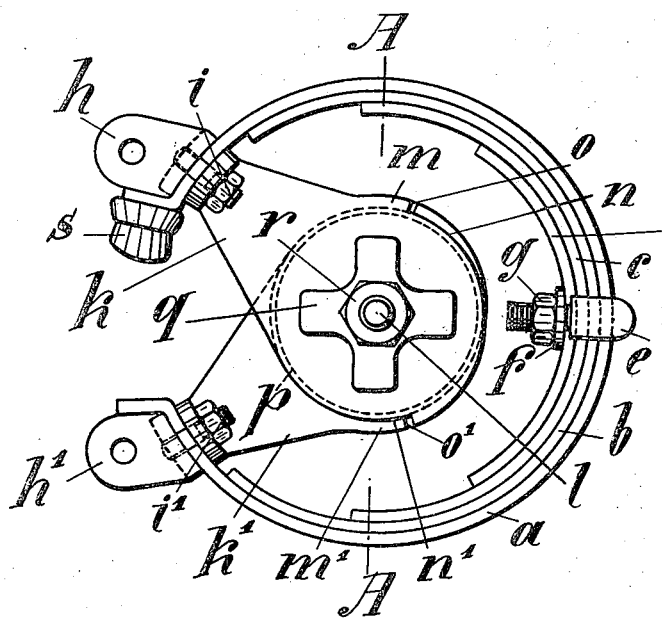

Fig. 1 is a side elevation.

Figure 2:
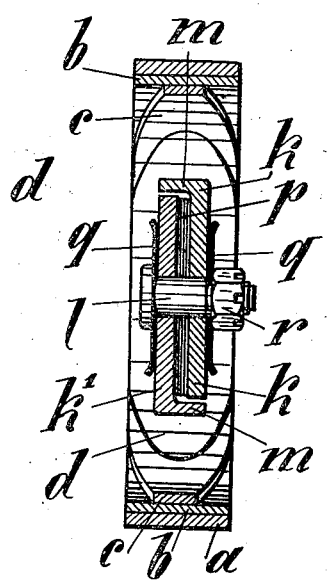

Fig. 2 a section on line A—A of Fig. 1 and

Figure 3:
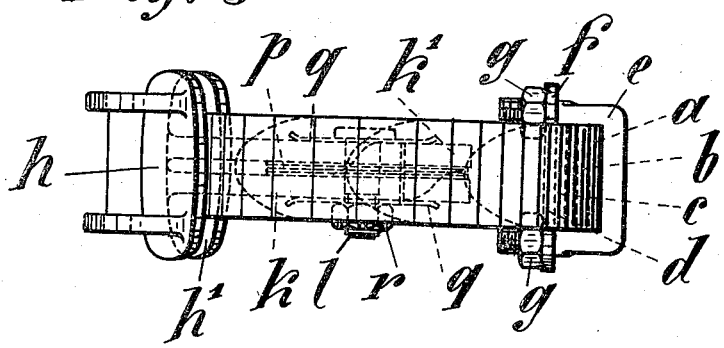

Fig. 3 a plan view.

$a$, $b$, $c$ and $d$ are the superposed steel blade springs which form together a curved blade spring. The blade springs are held together at the middle by a U-iron $e$ whose free arms are threaded and connected with one another by a plate $f$. Upon each of the threaded ends of the arms of the U-iron $e$ a nut $g$ is screwed so that, by tightening the nuts $g$, the blade springs are securely held together. At both ends of the outer blade spring $a$ eyes $h$ and $h'$ are arranged. When the spring is used e. g. for a motor car, the eye $h$ is connected by articulation with the frame, and the eye $h'$ is connected by articulation with one end of the main spring. To each eye $h$, $h'$ a lever $k$, $k'$ is fixed by means of a bolt $i$, $i'$ which traverse the ends of the blade spring $a$. The inner ends of the levers $k$, $k'$ are flattened to form disks and mounted upon a screw bolt $l$ which serves as axle. The levers $k$, $k'$ have flanges $m$, $m'$ at the circumference of the inner ends. The flanges $m$, $m'$ engage each with an indentation $n$ and $n'$ of the other flange so that the outward movement of the levers $k$ and $k'$, that is to say the one towards the other, is limited by the abutment edges $o$, $o'$. The screw bolt $l$ is arranged approximately at the center of the blade spring. A friction disk $p$ is mounted upon the screw bolt $l$ and enclosed between the enlarged ends of the levers $k$, $k'$. This friction disk $p$ is preferably made from porous fibre or from metal, graphite being pressed into the material of the disk by hydraulic pressure in order to ensure a constant lubrication. Cross shaped springs $q$ upon the outer surfaces of the levers $k$, $k'$ serve for pressing the levers elastically upon the friction disk. The nut $r$ upon the outer end of screw bolt $l$ permits to regulate the friction between the levers $k$, $k'$ and the friction disk $p$. A rubber buffer $s$ fixed upon the upper end of the blade spring $a$ ensures the soft contact between the ends of the blade spring $a$ if the superposed blades should be damaged. Brass strips are preferably inserted between the superposed blade springs $a$, $b$, $c$ and $d$ so that they slide softly the one upon the other.

With vehicles in which the main end of the suspension spring is situated above the point of suspension, the direction in which the spring works can be placed towards the outside by simply changing the blade springs so that the improved suspension spring can be used also in this case. This elastic connecting shackle can be used also as support for the saddle of a bicycle or of a motorcycle.

As the improved connecting shackle is absolutely stable laterally the work in lateral direction is done always by the main spring so that the vehicle does not rock to and fro as is the case with other auxiliary springs.

I claim:—

1. An improved elastic connecting shackle for vehicles for use in connection with the frame of the vehicle and with the suspension spring a circularly curved blade spring composed of several superposed steel blades, two levers one at each end of said spring, an axle arranged approximately at the center of said spring upon which the inner ends of said levers are pivoted and means upon said axle for softening by friction the vibrations of the spring.

2. An improved elastic connecting shackle for vehicles for use in connection with the frame of the vehicle and with the suspension spring a circularly curved blade spring composed of several superposed steel blades, an eye at one end of the outer steel blade fixed to the frame of the vehicle, an eye at the other end of said steel blade fixed to the suspension spring, two levers one at each end of said spring, an axle arranged approximately at the center of said spring upon which the inner ends of said levers are pivoted and means upon said axle for softening by friction the vibrations of the spring.

3. An improved elastic connecting shackle for vehicles for use in connection with the frame of the vehicle and with the suspension spring a circularly curved blade spring composed of several superposed steel blades, an eye at one end of the outer steel blade fixed to the frame of the vehicle, an eye at the other end of said steel blade fixed to the suspension spring, a rubber buffer at one of the ends of said outer steel blade, bolts of said eyes traversing the ends of said outer steel blade, two levers one at each end of said spring mounted upon said bolts, an axle arranged approximately at the center of said spring upon which the inner ends of said levers are pivoted and means upon said axle for softening by friction the vibrations of the spring.

4. An improved elastic connecting shackle for vehicles for use in connection with the frame of the vehicle and with the suspension spring, a circularly curved blade spring composed of several superposed steel blades, two levers one at each end of said spring having disk-shaped inner ends, a screw bolt serving as axle arranged approximately at the center of said spring upon which the inner ends of said levers are pivoted, means for limiting the movements of said levers with regard to one another, and means upon said axle for softening by friction the vibrations of the spring.

5. An improved elastic connecting shackle for vehicles for use in connection with the frame of the vehicle and with the suspension spring, a circularly curved blade spring composed of several superposed steel blades, two levers one at each end of said spring having disk-shaped inner ends, a screw bolt serving as axle arranged approximately at the center of said spring upon which the inner ends of said levers are pivoted, means for limiting the movements of said levers with regard to one another, a friction disk between the disk-shaped inner ends of said levers and means for pressing said lever against said friction disk.

In testimony whereof I affix my signature in presence of two witnesses.

ERNST KUHN.

Witnesses:
C. W. MILLIER,
F. HANN.